US008363673B2

(12) United States Patent  (10) Patent No.: US 8,363,673 B2
Wang  (45) Date of Patent: Jan. 29, 2013

(54) METHOD AND DEVICE FOR PROCESSING NETWORK TIME DELAY CHARACTERISTICS

(75) Inventor: Xinliang Wang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 449 days.

(21) Appl. No.: 12/678,965

(22) PCT Filed: Sep. 19, 2008

(86) PCT No.: PCT/CN2008/072437
§ 371 (c)(1),
(2), (4) Date: Mar. 18, 2010

(87) PCT Pub. No.: WO2009/039783
PCT Pub. Date: Apr. 2, 2009

(65) Prior Publication Data
US 2010/0208605 A1   Aug. 19, 2010

(30) Foreign Application Priority Data
Sep. 21, 2007 (CN) .......................... 2007 1 0154671

(51) Int. Cl.
*H04J 3/16* (2006.01)
*H04J 3/22* (2006.01)
*H04J 3/24* (2006.01)
*H04J 3/06* (2006.01)
(52) U.S. Cl. .................. 370/468; 370/473; 370/503
(58) Field of Classification Search .................. None
See application file for complete search history.

(56) References Cited

U.S. PATENT DOCUMENTS
6,658,027 B1   12/2003   Kramer et al.
(Continued)

FOREIGN PATENT DOCUMENTS
CN            1399462 A        2/2003
(Continued)

OTHER PUBLICATIONS

English-translation of Decision of Rejection for Chinese Application No. 2007101546713, dated Mar. 18, 2010.
(Continued)

*Primary Examiner* — Xavier Szewai Wong
(74) *Attorney, Agent, or Firm* — Marshall, Gerstein & Borun LLP (57) ABSTRACT

Embodiments of the present invention provide a method and device for processing network time delay characteristics. The method includes: determining whether network time delay changes; if the network time delay reduces, determining whether at least one blank frame is included in received but not played media frames of a real-time media service; if at least one blank frame is included in the received but not played media frames, extracting the blank frame from the received but not played media frames, the blank frame is a media frame, information amount of which is smaller than a preset first threshold, or difference between the information amount of which and the information amount of a previous media frame is smaller than a preset second threshold; if the network time delay increases, inserting the blank frame in the received but not played media frames. According to the embodiments of the present invention, when the network time delay changes, time for playing the received media frames may be adjusted by changing number of blank frames in the received but not played media frames, so as to reduce or eliminate the effect on the real-time media service generated by the network time delay characteristics.

19 Claims, 5 Drawing Sheets

U.S. PATENT DOCUMENTS

2007/0192782 A1* 8/2007 Ramaswamy .................... 725/9
2009/0016333 A1* 1/2009 Wang et al. .................. 370/389

FOREIGN PATENT DOCUMENTS

| CN | 1531276 A | 9/2004 |
|---|---|---|
| CN | 1756230 A | 4/2006 |
| CN | 1984057 A | 6/2007 |
| CN | 101119323 A | 2/2008 |

OTHER PUBLICATIONS

International Preliminary Report on Patentability for Application No. PCT/CN2008/072437, dated Mar. 24, 2010.
International Search Report for Application No. PCT/CN2008/072437, dated Jan. 15, 2009.
Written Opinion for Application No. PCT/CN2008/072437, dated Dec. 19, 2008.

* cited by examiner

METHOD AND DEVICE FOR PROCESSING NETWORK TIME DELAY CHARACTERISTICS

FIELD OF THE TECHNOLOGY

The present invention relates to data transmission technologies, and more particularly, to a method and device for processing network time delay characteristics.

BACKGROUND OF THE INVENTION

Along with continuous development of Internet technologies, real-time media services, such as voice communication (also known as network telephone, etc.), network audio/video, provided by the network become quite popular. However, quality status of current network can not fully meet requirements of the real-time media services. Inherent problems in the network, such as time delay, jitter, packet loss and out-of-order, have an impact on the network real-time media services, and thus directly affect the Quality of Service (QoS) of the real-time media services.

With reference to each factor that affects the real-time media services, the network time delay characteristics, such as time delay jitter, is very common. The time delay jitter refers to changing of transmission time delay for adjacent data packets in the network. Taking instant voice communication for example, a sender sends voice frames to the Internet with the same time interval, such as 10 ms, and the Internet forwards the voice frames to a receiver. When the Internet is in an ideal condition, the time interval that the voice frames arrive at the receiver is the same as that when the voice frames are sent, so as to make the voice played by the receiver is consistent with the voice sent out by the sender, thus the requirements of voice communication may be satisfied.

However, the quality status of actual network can not meet the requirements of the real-time media services. Since the voice frames sent out by the sender usually experience different routing and network congestion in the network, which makes the time delay of each voice frame arriving at the receiver through the network different from each other. In this case, the time interval that the voice frames arrive at the receiver is no longer totally consistent with the time interval when the voice frames are sent, which leads to producing the distortion in the voice played by the receiver. For instance, the playing is stopped after playing the received voice frames, to wait for the arrival of subsequent voice frames, or loss of voice frames occurs because of buffer overflow, etc., which directly affects the QoS of the voice communication.

Since the network time delay jitter can not be eliminated fundamentally, the effect of the network time delay jitter can only be alleviated through some measures.

A technology for processing the network time delay jitter is Time-scale anti-jitter technology. The technology stores the received voice frames with a buffer of the receiver (sometimes known as a jitter buffer), and performs time-domain tension or compression processing for all the voice frames stored in the buffer adopting a Synchronous Overlap and Add (SOLA) algorithm, a Pitch Synchronous Overlap and Add (PSOLA) algorithm, or a Waveform-similarity-based Synchronous Overlap and Add (WSOLA) algorithm, etc. The method specifically includes the following. When determining that the displaying for all the voice frames in the buffer will be finished before new voice frames arrive, i.e., when the network time delay increases, the time-domain tension processing is performed for all the voice frames stored in the buffer adopting any of the above algorithms, so as to extend the playing time of the voice frames. On the contrary, when determining that a lot of voice frames will be received by the buffer in a short time, i.e., when the network time delay reduces, in order to avoid the overflow and loss of the voice frames in the buffer, the time-domain compression processing is performed for all the voice frames stored in the buffer adopting any of the above algorithms, so as to shorten the playing time of the voice frames.

The Time-scale technology adjusts to changes of the network time delay jitter by adjusting the playing time of all the voice frames stored in the buffer. However, original sampling frequency of the voice will change because the time-domain processing is performed for the voice frames. Thus, the problem of voice distortion will be produced, if the receiver plays the voice frames after the time-domain processing according to the original sampling frequency. The specific representation is that the voice speed is faster or slower. Thus, it can be seen that in order to deal with the network time delay characteristics, the Time-scale technology may lead to interruption of the media playing and frame loss, etc., and may make the played media files generate the distortion in another form, which does not fundamentally reduce or eliminate the effect generated by the network time delay jitter on the real-time media services.

SUMMARY OF THE INVENTION

The technical problem to be solved by embodiments of the present invention is to provide a method and device for processing network time delay characteristics, which may reduce or eliminate effects on the network real-time media services generated by the network time delay fitter to some extent.

In order to solve the above technical problem, embodiments of the present invention are implemented through the following technical scheme.

A method for processing network time delay characteristics, includes:

determining whether network time delay changes;

if the network time delay reduces, determining whether at least one blank frame is comprised in received but not played media frames of a real-time media service;

if at least one blank frame is comprised in the received but not played media frames of the real-time media service, extracting the blank frame from the received but not played media frames, in which the blank frame is a media frame, information amount of which is smaller than a preset first threshold, or difference between the information amount of which and the information amount of a previous media frame is smaller than a preset second threshold;

if the network time delay increases, inserting the blank frame in the received but not played media frames.

A device for processing network time delay characteristics, including a blank frame searching module, a time-delay determining module, a blank frame inserting module and a blank frame extracting module; in which the blank frame searching module is configured to determine whether at least one blank frame is comprised in received but not played media frames in a real-time media, if at least one blank frame is comprised in the received but not played media frames, the blank frame searching module is further configured to provide a result indicating that the blank frame is comprised to the time-delay determining module, the blank frame is a media frame, information amount of which is smaller than a preset first threshold, or a difference between the information amount of which and the information amount of a previous media frame is smaller than a preset second threshold;

the time-delay determining module is configured to determine whether network time delay changes, if the network time delay reduces and the result indicating that the blank frame is comprised has been received from the blank frame searching module, the time-delay determining module is further configured to trigger the blank frame extracting module; if the network time delay increases, the time-delay determining module is configured to trigger the blank frame inserting module;

the blank frame extracting module is configured to extract the blank frame from the received but not played media frames;

the blank frame inserting module is configured to insert the blank frame in the received but not played media frames.

In the embodiments of the present invention, the time for playing media frames may be adjusted by changing number of blank frames in the received media frames which have not been played, so as to reduce or eliminate effects on the real-time media services generated by the network time delay characteristics to some extent. Meanwhile, insertion or extraction of the blank frames does not affect the playing of the real-time media frames. Therefore, the technical solution provided by embodiments of the present invention not only solve the problem that the network time delay characteristics affect the real-time media service, but also reduce or eliminate the distortion of the real-time media playing caused by the network time delay characteristics to some extent.

EMBODIMENTS OF THE INVENTION

Embodiments of the present invention provide a method and device for processing network time delay characteristics. To clearly explain the specific implementation modes of embodiments in the present invention, the embodiments of the present invention are described in detail in the following accompanying with drawings.

Embodiments of the present invention mainly put forward the following. When processing the network time delay characteristics in the real-time media services, determining whether the network time delay changes. If the network time delay reduces, determining whether there are blank frames in the received media frames which have not been played. If there are blank frames, extracting the blank frames from the received media frames which have not been played. If the network time delay increases, inserting the blank frames in the received media frames which have not been played.

When inserting the blank frames, it may be first determined whether at least one blank frame is included in the received media frames which have not been played. If there is at least one blank frame in the received media frames which have not been played, inserting a blank frame to make it adjacent to the at least one blank frame in the received media frames which have not been played yet.

Here, the blank frame refers to the media frame, information amount of which is less than a preset first threshold, or the difference between the information amount of which and the information amount of a previous media frame is less than a preset second threshold. Playing of the media will not be affected when processing such blank frames.

The first threshold is not larger than the minimum information amount in the information amount of the media frame that can be sensed by a user. The second threshold is not larger than the minimum difference of the difference between the information amount of one media frame and the information amount of a previous media frame, in which the minimum difference is the minimum one that may be sensed by a user.

Figure 10:
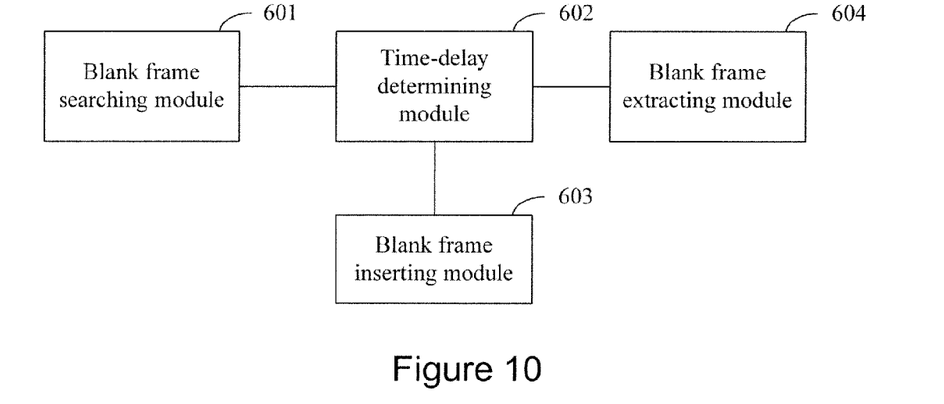
FIG. 10 is a schematic diagram illustrating constitution of a device for processing network time delay characteristics provided by an embodiment of the present invention.

FIG. 10 is a device for processing network time delay characteristics provided by an embodiment of the present invention. The device includes a blank frame searching module 601, a time-delay determining module 602, a blank frame inserting module 603 and a blank frame extracting module 604.

The blank frame searching module 601 is configured to determine whether the received media frames which have not been played in the real-time media services include at least one blank frame. If the received media frames which have not been played yet in the real-time media services include at least one blank frame, the blank frame searching module 601 is further configured to provide a result indicating that the blank frame is included to the time-delay determining module.

The time-delay determining module 602 is configured to determine whether the network time delay changes, and trigger the blank frame extracting module 604 if the network time delay reduces and the result indicating that the blank frame is included which is provided by the blank frame searching module 601 is received, and trigger the blank frame inserting module 603 if determining that the network time delay increases.

The blank frame inserting module 603 is configured to insert the blank frames in the received but not played media frames.

The blank frame extracting module 604 is configured to extract the blank frames from the received but not played media frames.

The time-delay determining module 602 may be configured to trigger the blank frame inserting module 603, when determining that the network time delay increases and the result indicating that the blank frame is included which is provided by the blank frame searching module 601 is received.

The blank frame inserting module 603 is configured to insert the blank frame to make it adjacent to the blank frame already existed in the received but not played media frames.

The time-delay determining module 602 may include a time-delay characteristics predicting unit, a first difference calculating unit and a determining unit.

The time-delay characteristics predicting unit is configured to obtain a time-delay jitter prediction value and the playing duration needed for playing the received but not played media frames.

The first difference calculating unit is configured to calculate the difference between the time-delay jitter prediction value and the playing duration.

The determining unit is configured to compare the difference with the pre-set first threshold, and determine that the network time delay increases if the difference is larger than the first threshold, and compare the difference with the pre-set second threshold if the difference is not larger than the first threshold, and determine that the network time delay reduces if the difference is less than the second threshold.

The time-delay characteristics predicting unit may include a first time obtaining sub-unit, a second time obtaining sub-unit and a second difference calculating sub-unit.

The first time obtaining sub-unit is configured to obtain time for extracting the media frames for playing last time.

The second time obtaining sub-unit is configured to obtain time for receiving the media frames last time.

The second difference calculating sub-unit is configured to subtract the time obtained by the second time obtaining sub-unit from the time obtained by the first time obtaining sub-time to get the time-delay jitter prediction value.

The blank frame inserting module 603 may include a third difference calculating unit, an inserting-frame-number calculating unit and a frame inserting unit.

The third difference calculating unit is configured to subtract the first threshold from the difference obtained by the first difference calculating unit.

The inserting-frame-number calculating unit is configured to divide the calculation result of the third difference calculating unit by playing duration of a signal frame, to get a first frame number of blank frames needed to be inserted.

The frame inserting unit is configured to insert the blank frames of the first frame number in the received but not played media frames.

The blank frame extracting module 604 may include a fourth difference calculating unit, an extracting-frame-number calculating unit and a frame extracting unit.

The fourth difference calculating unit is configured to subtract the difference obtained by the first difference calculating unit from the second threshold.

The extracting-frame-number calculating unit is configured to divide the calculation result of the fourth difference calculating unit by the playing duration of a single frame, to get a second frame number of blank frames needed to be extracted.

The frame extracting unit is configured to extract blank frames of the second frame number from the received but not played media frames.

Detailed descriptions for the present invention are provided in the following with several embodiments.

The First Embodiment

Voice communication service is taken as an example in the embodiment, received voice frames are stored in a buffer, in which the buffer is a section of fixed-size storage area. However, the scheme of the embodiment is applicable to all real-time audio services.

The method for processing the network time delay characteristics provided by this embodiment of the present invention includes: determining whether there is a silence frame in received voice frames, if there is a silence frame in the received voice frames and determining the network time delay increases, inserting silence frames in a silence section constituted by silence frames, if determining the network time delay reduces, extracting the silence frames from the silence section constituted by silence frames. Since the voice frame includes silence frame and non-silence frame, playing distortion of the non-silence frames will not be generated by increasing or reducing the silence frames. No more than that voice intervals heard by users will increase or reduce, which is generally not easily to be detected by users.

Figure 1:
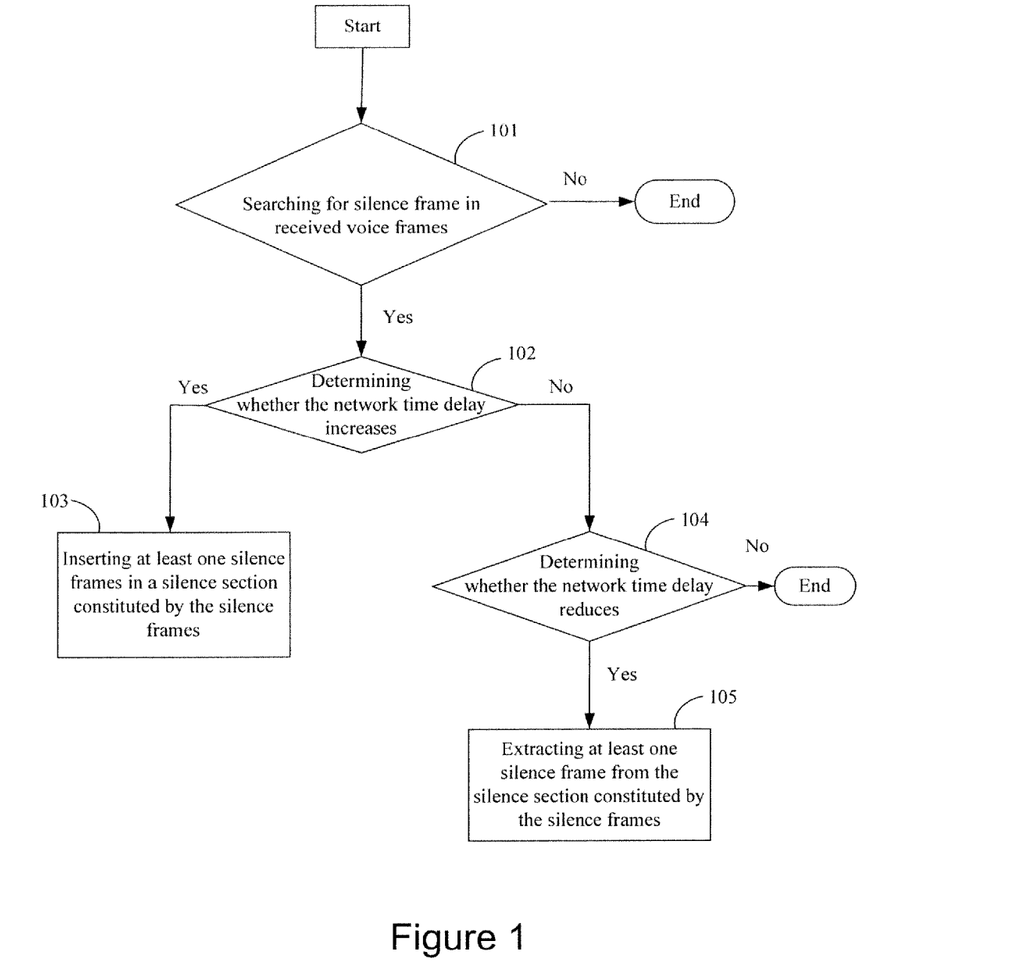
FIG. 1 is a flow chart illustrating a method for processing network time delay characteristics provided by a first embodiment of the present invention.

FIG. 1 is a flow chart illustrating a method for processing network time delay characteristics provided by the first embodiment of the present invention. The method includes the following.

Block 101: searching for silence frames in received voice frames. If there is silence frames in the received voice frames, proceeding to block 102; otherwise, terminating the flow.

Block 102: determining whether network time delay increases. If the network time delay increases, proceeding to block 103; otherwise, proceeding to block 104.

Block 103: inserting a silence frame in a silence section constituted by silence frames.

Block 104: determining whether the network time delay reduces. If the network time delay reduces, proceeding to block 105; otherwise, terminating the flow.

Block 105: extracting the silence frame from the silence section constituted by the silence frames.

In the method provided by the first embodiment of the present invention, when the network time delay changes, the playing duration of received voice frames is adjusted by changing number of silence frames in the received voice frames, so as to reduce or eliminate effect on the voice communication generated by the network time delay characteristics.

The above method is merely an example for explaining one possible implementation method of the present invention. The execution order of each block may be properly exchanged. For instance, it may be first determined whether the network time delay changes, if the network time delay changes, whether there are silence frames in the received voice frames is further determined. It may be also first determined whether the network time delay reduces, if the network time delay doesn't reduce, whether the network time delay increases is further determined, etc.

The Second Embodiment

In the embodiment of the present invention, voice communication service is taken as an example, received voice frames are stored in a buffer, in which the buffer is a section of fixed-size storage area.

Figure 2:
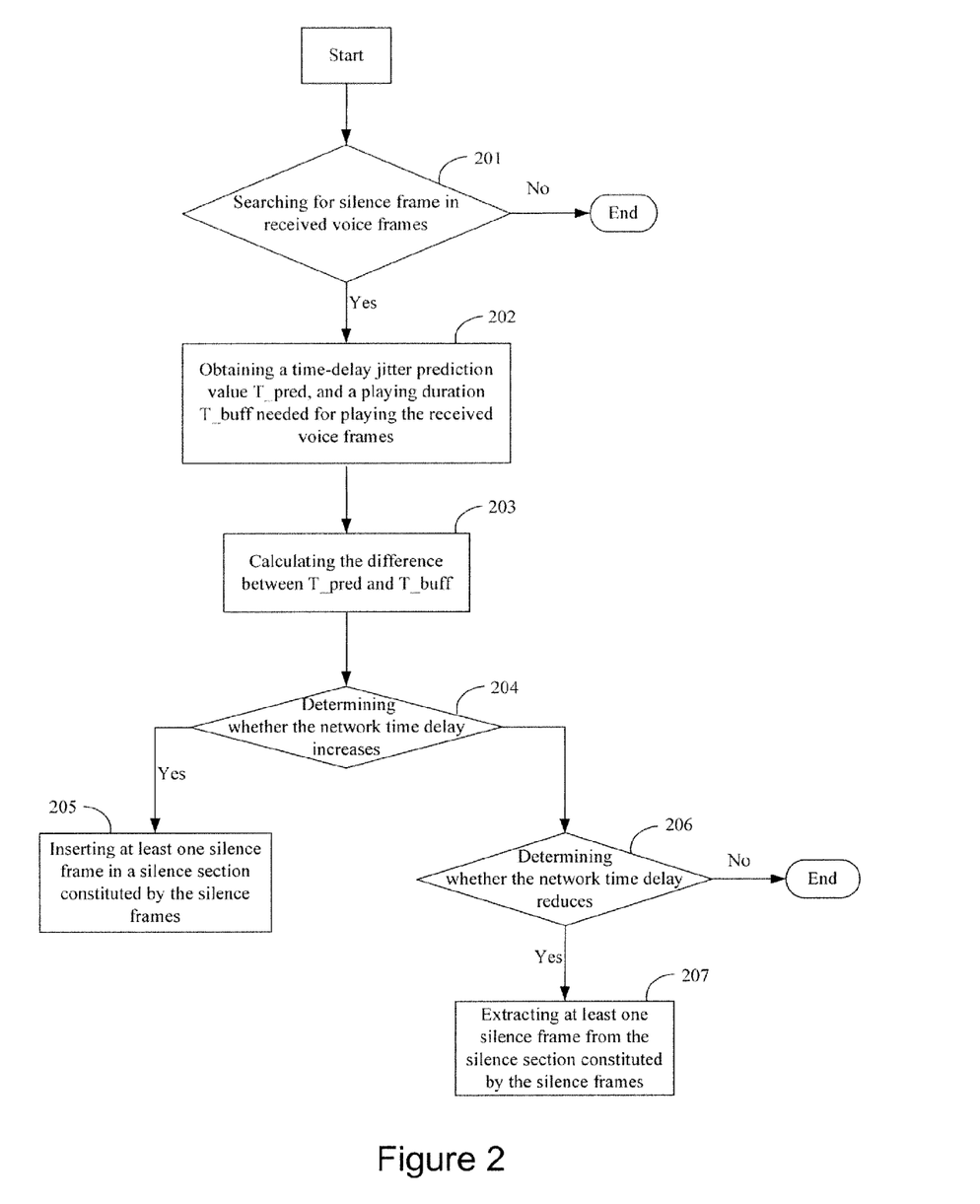
FIG. 2 is a flow chart illustrating a method for processing network time delay characteristics provided by a second embodiment of the present invention.

FIG. 2 is a flow chart illustrating a method for processing network time delay characteristic provided by a second embodiment of the present invention. The method includes the following.

Block 201: searching for silence frame in received voice frames. If there is at least one silence frame in the received voice frames, proceeding to block 202; otherwise, terminating the flow.

Block 202: obtaining a time-delay jitter prediction value T_pred, and a playing duration T_buff needed for playing the received voice frames.

The means for obtaining the time-delay jitter prediction value T_pred may be as follows. Subtracting receiving time T_last for receiving the voice frames last time, from the time T_get (that is, the time for getting voice frames last time) for extracting the voice frames from the received voice frames for playing last time, so as to obtain the time-delay jitter prediction value.

The frame number of the received voice frames may be calculated in real time. For instance, each time when a voice frame is received, adding one to the frame number. Each time when a voice frame is extracted, subtracting one from the frame number. Besides, before sending the voice frames, the sender sends coding mode of the voice frames to the receiver. The receiver obtains playing duration T_frame of each voice frame according to the coding mode. Thus, T_buff may be obtained by calculating the frame number in the buffer and the playing duration of each frame, that is, the product of T_frame and the frame number in the buffer.

The calculation in above example is based on all the frames in the buffer, other calculation methods may also be adopted as required.

Block 203: calculating the difference between T_pred and T_buff.

Here, if the difference is positive, that is, T_pred is larger than T_buff, it shows that predicted playing speed of the voice frames is larger than the speed for receiving the voice frames, and a silence frame may be inserted into the silence section constituted by the silence frames. If the difference is negative, that is, T_pred is less than T_buff, it shows that predicted playing speed of the voice frames is less than the speed for receiving the voice frames, and silence frames may be extracted from the silence section constituted by the silence frames to reduce the number of the silence frames. Thus, the playing duration of the voice frames may be adjusted through predicting the time delay jitter, so as to reduce or eliminate the effect on the network real-time media service generated by jitter. Here, the determination may also be performed according to whether the difference is larger than a preset value.

In above blocks, when the difference between T_pred and T_buff is small, the jitter does not necessarily have a great influence on the voice playing. Frequent insertion and extraction of the silence frames may cause unnecessary burden on the devices at the receiver. In order to make the prediction more accurate, the following blocks may be further included after block 203 in the embodiment.

Block 204: comparing the difference obtained after the calculation in block 203 with the preset first threshold T_max. If the difference is larger than T_max, it shows that the network time delay increases, proceeding to block 205; otherwise, proceeding to block 206.

Block 205: inserting a silence frame in the silence section constituted by the silence frames.

Block 206: comparing the difference obtained after the calculation in block 203 with the preset second threshold T_min. lithe difference is less than T_min, it shows that the network time delay reduces, proceeding to block 207; otherwise, terminating the flow.

T_max is not less than T_min.

Block 207: extracting a silence frame from the silence section constituted by the silence frames.

The execution order of blocks 204-205 may be exchanged with that of blocks 206-207.

In the above method, the difference between T_pred and T_buff is compared with the preset threshold through obtaining the time-delay jitter prediction value T_pred and the playing duration T_buff needed for playing the received voice frames. Thus, when the difference between T_pred and T_buff exceeds a certain threshold scope, determining that major changes have taken place in the network time delay, and subsequently determining it is necessary to insert or extract the silence frames.

The Third Embodiment

In this embodiment of the present invention, voice communication service is taken as an example, received voice frames are stored in a buffer, in which the buffer is a section of fixed-size storage area.

Figure 3:
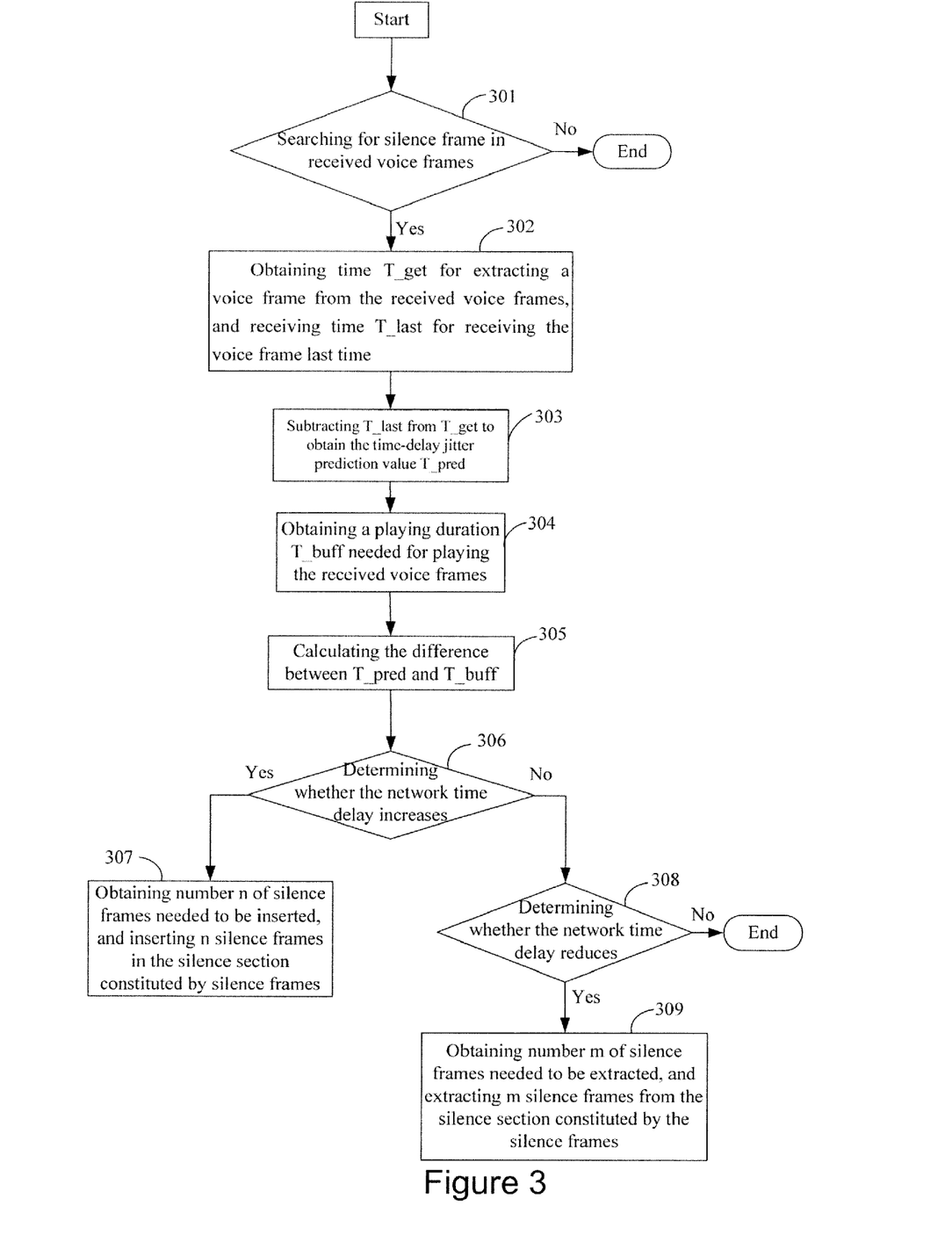
FIG. 3 is a flow chart illustrating a method for processing network time delay characteristics provided by a third embodiment of the present invention.

FIG. 3 is a flow chart illustrating a method for processing network time delay characteristics provided by a third embodiment of the present invention. The method includes the following.

Block 301: searching for silence frame in received voice frames. If there is at least one silence frame, proceeding to block 302; otherwise, terminating the flow.

Block 302: obtaining time T_get for extracting a voice frame from the received voice frames last time, and receiving time T_last for receiving the voice frame last time.

The buffer is a fixed-size storage area. The voice frame which is first inserted into the buffer is extracted first. Thus, it may be considered that a voice frame which can be extracted ranks first in the buffer. While compared with the voice frame ranking first, another voice frame ranks last in the buffer is the voice frame recently received. For instance, the buffer may store five voice frames which are A, B, C, D and E respectively. A is the first one that enters into the buffer in the five voice frames, followed by B, C and D in sequence, while E is the last one that enters into the buffer in the five voice frames. Thus, the one that can be extracted currently in the five voice frames is A which ranks first. While, E, which ranks last in the buffer, is the recently received voice frame since A has been extracted.

Block 303: subtracting T_last from T_get to obtain the time-delay jitter prediction value T_pred.

Block 304: obtaining playing duration T_buff needed for playing the received voice frames.

Block 305: calculating the difference between T_pred and T_buff.

Block 306: comparing the difference obtained after the calculation in block 305 with the preset first threshold T_max. If the difference is larger than T_max, it shows that the network time delay increases, proceeding to block 307; otherwise, proceeding to block 308.

Block 307: subtracting T_max from the difference between T_pred and T_buff to obtain a value, dividing the value by the playing duration T_frame of each voice frame, to obtain the number n of frames needed to be inserted, and inserting n silence frames in the silence section constituted by the silence frames.

Block 308: comparing the difference obtained after the calculation in block 305 with the preset second threshold T_min. If the difference is smaller than T_min, it shows that the network time delay reduces, proceeding to block 309; otherwise, terminating the flow.

Block 309: subtracting the difference between T_pred and T_buff from T_min to obtain a value, dividing the value by T_frame to obtain the number m of silence frames needed to be extracted, and extracting m silence frames from the silence section constituted by the silence frames.

In the method provided by the third embodiment of the present invention, the method for obtaining the time-delay jitter prediction value T_pred is as follows. Subtracting receiving time T_last for receiving the voice frames last time, from the time T_get for extracting one or several voice frames from the received voice frames last time for playing, to obtain a time-delay jitter prediction value.

In the method provided by the third embodiment of the present invention, it is necessary to obtain T_get and T_last. Thus, the execution condition of the method is as follows. Each time when extracting a voice frame from the buffer for playing, or receiving a voice frame from the buffer, executing blocks 301~309.

And, in the third embodiment of the present invention, the number of silence frames needed to be extracted or inserted is obtained by calculation according to T_pred, T_buff and a preset threshold, which may accurately eliminate the effect on voice generated by the time delay jitter.

Besides, in order to further improve the accuracy of the time delay jitter prediction, the number of frames needed to be inserted and the number of frames needed to be extracted respectively calculated in blocks 307 and 309 may be adjusted. For instance, subtracting adjustment x from the number of frames needed to be extracted and adding the adjustment x to the number of frames needed to be inserted, in which x is an integer which is larger than or equal to zero. In specific implementations, persons having ordinary skill in the art may select the value of x according to system requirements.

In order to accurately predict the time delay jitter, another embodiment of the present invention may obtain the time-delay jitter prediction value by subtracting a preset threshold from a network time delay for receiving a voice frame. And then, according to the method for calculating frame number provided by the third embodiment of the present invention, the number of silence frames needed to be inserted or the number of silence frames needed to be extracted may be obtained. Thus, it is necessary to obtain sending time of the received voice frame. In some cases, the sending time may be directly obtained from frame information. In other cases, the sending time may also be obtained through other means, such as, be obtained through interacting with the sender.

The method for obtaining the first threshold T_max and the second threshold T_min is described in the following.

The jitter should be considered when selecting T_max and T_min. If T_max is too large or T_min is too small, the changing of the network time delay can not be accurately determined and vice versa. Thus, embodiments of the present invention may adopt a jitter tracking technology, and may select T_max and T_min according to multiple jitter. The specific method includes: taking an average value of M time-delay jitter prediction values with larger values in N successive time-delay jitter prediction values as T_max, taking an average value of M time-delay jitter prediction values with smaller values in N successive time-delay jitter prediction values as T_min. For instance, taking an average value of three time-delay jitter prediction values with larger values in five successive time-delay jitter prediction values as T_max, and taking an average value of three time-delay jitter prediction values with smaller values in five successive time-delay jitter prediction values as T_min.

The initial values of T_max and T_min may be preset values, or values obtained after a certain calculation according to the difference between T_pred and T_buff obtained after the first calculation.

In embodiments of the present invention, the received voice frames are stored in the buffer. Thus, each time when receiving a voice frame in the buffer, silence detection may be performed for the voice frame, and the silence frame may be identified, that is, an identifier is set for the silence frame. Thus, the specific method for searching for the silence frame in the embodiment of the present invention is searching for the silence frame in the received voice frames according to the identifier of the silence frame.

There are many methods for identifying the silence frame, which may be selected according to requirements. For instance, identifying a silence frame with a flag in the frame data, such as a frame head, or recording whether a frame is a silence frame with a separate file in a storage device.

If the silence detection is not performed each time when receiving a voice frame in the buffer, the specific method for searching for the silence frame in this embodiment of the present invention is that, performing the silence detection for the received voice frames to obtain the silence frames.

The silence detection for the voice frames may adopt several methods as follows.

The first mode: computing voice signal energy and background noise energy for the voice frame. If the ratio of the background noise energy and the voice signal energy is larger than a preset silence threshold, identifying the voice frame as the silence frame. The silence threshold is above mentioned first threshold, which may be any number larger than or equal to 0.6 and smaller than 1, and may be other values.

The second mode: calculating short-term average energy for a voice frame, if the short-term average energy is smaller than a silence energy determining threshold, identifying the voice frame as a silence frame.

The third mode: determining according to the time-domain zero crossing rate of a voice frame, if the time-domain zero crossing rate exceeds a threshold, identifying the voice frame as silence.

Several silence detection methods are briefly described in the foregoing. Since there are so many silence detection methods, no further descriptions are provided hereinafter. The other silence detection methods which are not listed here are also applicable to the embodiment of the present invention.

The specific implementation process of the methods provided by embodiments of the present invention is described in the foregoing. The device provided by the embodiment of the present invention will be described in the following.

Figure 4:
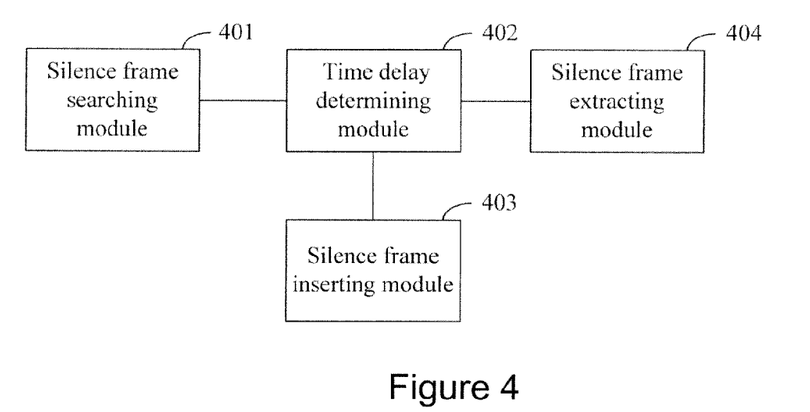
FIG. 4 is a schematic diagram illustrating constitution of a device for processing network time delay characteristics provided by an embodiment of the present invention.

With reference to FIG. 4, FIG. 4 is a device for processing network time delay characteristics provided by an embodiment of the present invention. The device includes a silence frame searching module 401, a time delay determining module 402, a silence frame inserting module 403 and a silence frame extracting module 404.

The silence frame searching module 401 is configured to search for a silence frame in received voice frames, and trigger the time delay determining module 402 if there is at least one silence frame in the received voice frames.

The time delay determining module 402 is configured to trigger the silence frame inserting module 403 if determining the network time delay increases, and is configured to trigger the silence frame extracting module 404 if determining the network time delay reduces.

The silence frame inserting module 403 is configured to insert at least one silence frame in a silence section constituted by the silence frames.

The silence frame extracting module 404 is configured to extract at least one silence frame from the silence section constituted by the silence frames.

Figure 5:
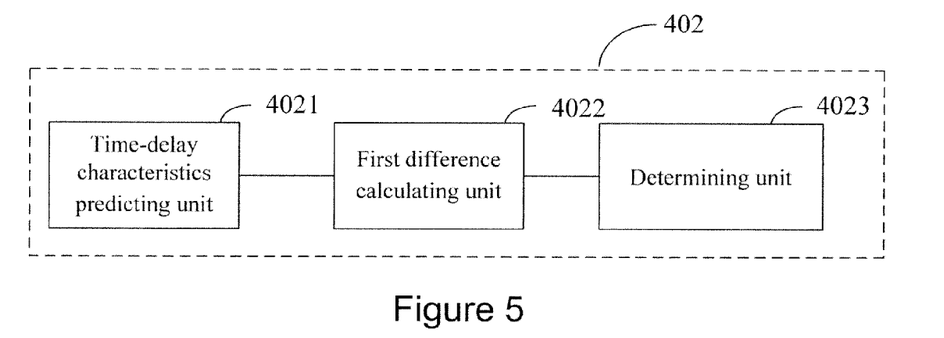
FIG. 5 is a schematic diagram illustrating constitution of a time delay determining module provided by an embodiment of the present invention.

In the device provided by the embodiment of the present invention, the time delay determining module 402 may be implemented through various ways. Here, only one example is provided. With reference to FIG. 5, the module includes: a time-delay characteristics predicting unit 4021, a first difference calculating unit 4022 and a determining unit 4023.

The time-delay characteristics predicting unit 4021 is configured to obtain a time-delay jitter prediction value T_pred and time T_buff needed for playing the received voice frames.

The first difference calculating unit 4022 is configured to calculate the difference between T_pred and T_buff.

The determining unit 4023 is configured to compare the difference with the preset first threshold T_max. If the difference is larger than T_max, it shows the network time delay increases. If the difference is equal to or smaller than T_max, the determining unit 4023 compares the difference with preset second threshold T_min. If the difference is smaller than T_min, it shows the network time delay reduces.

Figure 6:
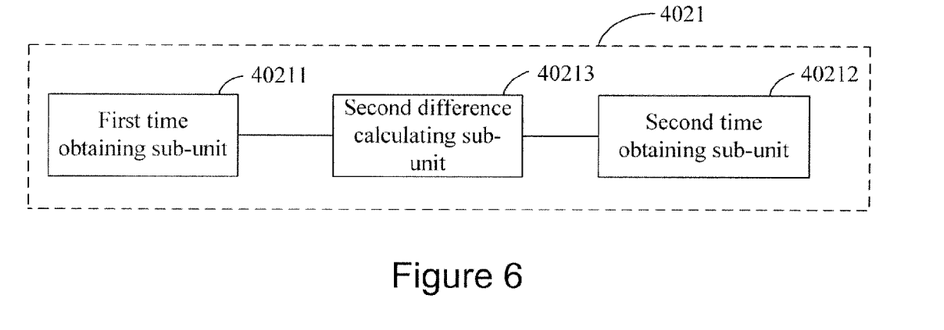
FIG. 6 is a schematic diagram illustrating constitution of a jitter predicting unit provided by an embodiment of the present invention.

In the device provided by embodiments of the present invention, the time-delay characteristics prediction unit 4021 may be implemented through various ways. Here, only one example is provided. With reference to FIG. 6, the unit includes a first time obtaining sub-unit 40211, a second time obtaining sub-unit 40212 and a second difference calculating sub-unit 40213.

The first time obtaining sub-unit 40211 is configured to obtain time T_get for extracting a voice frame from received voice frames.

The second time obtaining sub-unit 40212 is configured to obtain receiving time T_last for receiving the voice frame last time since another voice frame has been extracted.

The second difference calculating sub-unit 40213 is configured to subtract T_last obtained by the second time obtaining sub-unit from T_get obtained by the first time obtaining sub-unit, to obtain the time-delay jitter prediction value T_pred.

Figure 7:
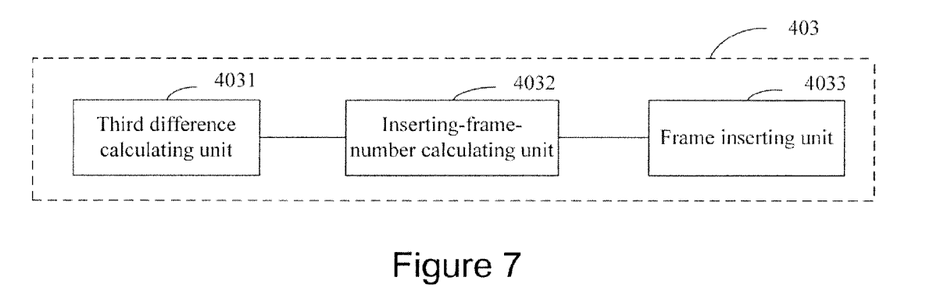
FIG. 7 is a schematic diagram illustrating constitution of a silence frame inserting module provided by an embodiment of the present invention.

In order to implement accurate frame inserting process and frame extracting processing, that is, in order to make the time-delay characteristics prediction more accurate, when the time-delay characteristics prediction unit 4021 adopts the implementation mode as illustrated in FIG. 6, with reference to FIG. 7, the silence frame inserting module 403 includes: a third difference calculating unit 4031, an inserting-frame-number calculating unit 4032 and a frame inserting unit 4033.

The third difference calculating unit 4031 is configured to subtract preset first threshold T_max from the difference obtained by the first difference calculating unit 4022.

The inserting-frame-number calculating unit 4032 is configured to divide the calculation result obtained by the third difference calculating unit 4031 by playing duration T_frame of each voice frame, to obtain number n of silence frames needed to be inserted.

The frame inserting unit 4033 is configured to insert n silence frames in the silence section constituted by the silence frames.

Figure 8:
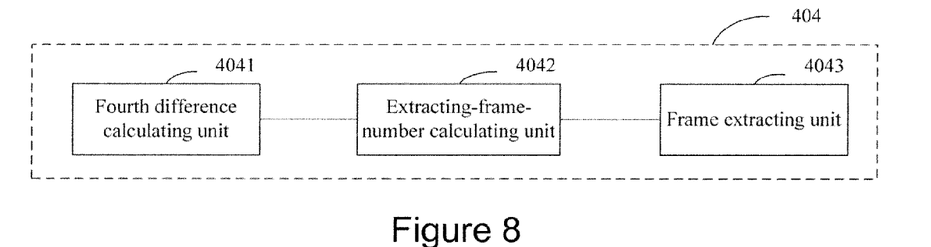
FIG. 8 is a schematic diagram illustrating constitution of a silence frame extracting module provided by an embodiment of the present invention.

With reference to FIG. 8, the silence frame extracting module 404 includes: a fourth difference calculating unit 4041, an extracting-frame-number calculating unit 4042 and a frame extracting unit 4043.

The fourth difference calculating unit 4041 is configured to subtract the difference obtained by the first difference calculating unit 4022 from the second threshold T_min.

The extracting-frame-number calculating unit 4042 is configured to divide the calculation result obtained by the fourth difference calculating unit 4041 by the playing duration T_frame of each voice frame, to obtain number m of the silence frames needed to be extracted.

The frame extracting unit 4043 is configured to extract m silence frames from the silence section constituted by the silence frames.

Figure 9:
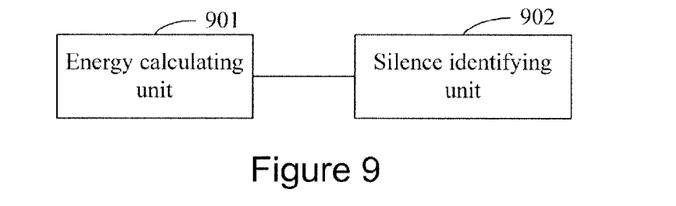
FIG. 9 is a schematic diagram illustrating constitution of a silence frame detecting module provided by an embodiment of the present invention.

The silence detection may be performed each time when a voice frame is received in the buffer. An embodiment of the present invention provides a silence frame detecting module. With reference to FIG. 9, the silence frame detecting module is configured to perform the silence detection for the received voice frames, and identify the silence frame. The silence frame detecting module includes the following.

An energy calculating unit 901, which is configured to calculate voice signal energy for each voice frame and background noise energy.

And a silence identifying unit 902, which is configured to calculate the ratio of the background noise energy and the voice signal energy. If the ratio is larger than a preset silence threshold, the voice frame is identified as the silence frame.

The silence frame searching module 401 provided by embodiments of the present invention may search for the silence frame according to the identifier of the silence frame.

The silence frame detecting unit may be set in the device for processing the network time delay characteristics provided by the embodiments of the present invention, or may be set in other devices, which does not affect the implementation of the embodiments in the present invention.

In the embodiments of the present invention, if the silence detection is not performed each time when a voice frame is received in the buffer, the silence frame searching module 401 provided by the embodiment of the present invention may include an energy calculating unit, which is configured to calculate the voice signal energy for each voice frame and the background noise energy; and a triggering unit, which is configured to calculate the ratio of the background noise energy and the voice signal energy, if the ratio is larger than the preset silence threshold, the triggering unit is further configured to trigger the time delay determining module 402.

It should be noted that, in the method and device provided by embodiments of the present invention, whether the network time delay reduces may be determined at first, and then whether the network time delay increases may be determined, which does not affect the implementation of the embodiments of the present invention.

The Fourth Embodiment

In the embodiment of the present invention, real-time video service is taken as an example to describe the implementation method of the invention.

The jitter prediction and the determination about whether to extract frames and insert frames are respectively identical with that in the above voice processing. The same frame extraction and frame insertion are also performed. When determining it is necessary to insert frames, inserting the blank frames. When determining it is necessary to extract frames, extracting some blank frames from the video frames waiting to be played next.

The blank frames may be identical with some video frames in the buffer. For instance, when detecting that there are some monochrome frames in the buffer, several identical monochrome frames are inserted into the locations of these monochrome frames already existed as required. Or, when detecting that there are some successive and repeated frames (that is, the following frame is identical with, or almost identical with a previous frame), several frames identical with the repeated frames may be inserted into the locations of the successive and repeated frames as required. Frames of other categories may also be adopted as the blank frames.

If some common frames are extracted from the buffer, the distortion may occur in the video playing, because some common video frames have been extracted without playing. Therefore, if some policies are adopted when extracting, e.g., extracting one frame every several frames, which may produce less distortion and make users not easily to learn the distortion.

The method for determining the video monochrome frame is as follows. If data about all the pixels in one video frame is the same, or number of sampling points with difference pixel data is smaller than a preset value, or ratio of number of the sampling points with different pixel data and number of all the pixels in the video frame is smaller than a preset value, the frame is determined to be a monochrome frame. For instance, the average value of RGB value about each pixel in the media frame may be calculated, and then the difference between the RGB value about each pixel and the average value is determined. If number of pixels, the difference between the RGB value of which and the average value is larger than the preset third threshold, is smaller than the first threshold, the video frame is determined to be the monochrome frame.

The method for determining the video repeated frame is as follows. If data about all the pixels in one video frame is identical with that of each two-dimensional sampling points of the previous frame, the following frame is a repeated frame of the previous frame. For instance, it may be determined that whether the RGB value about each pixel in the video frame is identical with the RGB value about corresponding pixel in previous video frame, if number of pixels with different RGB values is smaller than the second threshold, the video frame is determined to be the successive and repeated frame.

The method for determining whether to extract frames and insert frames is identical with the processing in the above embodiments about the voice communication. Here, brief descriptions are provided in an example of extracting and inserting monochrome frames.

Searching for monochrome frames in received video frames. If there is at least one monochrome frame in the received video frame, determining the network time delay increases, and inserting the same monochrome frame in the location of the monochrome frames previously existed. If determining the network time delay reduces, extracting at least one monochrome frame from the location of the monochrome frames previously existed. No distortion may occur during the video playing because of the increase or decrease of the monochrome frame. The only result which may be led to by the increase or decrease of the monochrome frame is that, the duration for users to see some parts (e.g., black screen, while screen) in the video may be extended or shortened, which is generally not easily to be detected by users.

Processes for extracting and inserting the repeated frames are also similar. Searching for successive and repeated frames in received video frames. If there are successive and repeated frames in the received video frames, determining the network time delay increases, and inserting the same repeated frames in the location of the successive and repeated frames already existed. If determining the network time delay reduces, extracting the repeated frames from the location of the successive and repeated frames already existed. No distortion may occur during the video playing because of the increase or decrease about the number of repeated frames. The only result which may be led to by the increase or decrease of the number of the repeated frames is that, the duration for users to see some video pictures may be extended or shortened, which is generally not easily to be detected by users.

In the embodiment, the time T_get for extracting a video frame from the received video frames last time and the receiving time T_last for receiving the video frame last time may be obtained. The time-delay jitter prediction value T_pred may be obtained by subtracting T_last from T_get. The playing duration T_buff needed for playing the received video frames may be obtained, and the difference between T_pred and T_buff may be calculated.

The calculated difference is compared with the preset first threshold T_max, if the difference is larger than T_max, it shows that the network time delay increases, and the same monochrome frame or repeated frame may be inserted into the location of the monochrome frame or repeated frame.

The calculated difference is compared with the preset second threshold T_min, if the difference is smaller than T_min, it shows that the network time delay reduces, and the monochrome frame or repeated frame may be extracted from the location of the monochrome frame or repeated frame.

The number of frames needed to be inserted or extracted may be calculated using the following method. Subtracting T_max from the difference between T_pred and T_buff to obtain a value, and dividing the value by the playing duration T_frame for playing each frame, to obtain number n of frames needed to be inserted. Subtracting the difference between T_pred and T_buff from T_min to obtain another value, and dividing the another value by T_frame, to obtain number m of blank frames needed to be extracted.

In order to further improve the accuracy about the time delay jitter prediction, the calculated number of frames needed to be inserted or extracted may be adjusted. For instance, the adjustment x may be subtracted from the number of frames needed to be extracted, and the adjustment x may be added to the number of frames needed to be inserted, in which x is an integer larger than or equal to zero. In specific implementation, persons having ordinary skill may select the value for x according to system requirements.

The method for selecting T_max and T_min has already been described in the foregoing, and no further descriptions are provided hereinafter.

The method and device for processing the network time delay characteristics provided by embodiments of the present invention have been described in detail in the foregoing. Persons having ordinary skill in the art may change the specific implementation mode and application scope according to the idea presented in the embodiments of the present invention. In view of above, the contents in the specification should not be understood as the limitation of the invention.

The invention claimed is:

1. A method for processing network time delay characteristics, comprising:
   determining whether network time delay changes;
   if the network time delay reduces, determining whether at least one blank frame is comprised in received but not played media frames of a real-time media service;
   if at least one blank frame is comprised in the received but not played media frames of the real-time media service, extracting the blank frame from the received but not played media frames, wherein the blank frame is a media frame, information amount of which is smaller than a preset first threshold, or difference between the information amount of which and the information amount of a previous media frame is smaller than a preset second threshold;
   if the network time delay increases, inserting the blank frame in the received but not played media frames;
   wherein determining whether the network time delay changes comprises,
   obtaining a time-delay litter prediction value, wherein the time-delay litter prediction value is a time interval between a time for extracting a media frame for playing and another time for receiving a media frame last time, obtaining a playing duration needed for playing the received but not played media frames, calculating a difference between the time-delay litter prediction value and the playing duration, comparing the difference with the preset first threshold, if the difference is larger than the first threshold, determining the network time delay increases, comparing the difference with the preset second threshold, and if the difference is smaller than the second threshold, determining the network time delay reduces.

2. The method according to claim 1, wherein inserting the blank frame in the received but not played media frames comprises:

determining whether at least one blank frame is comprised in the received but not played media frames; and if at least one blank frame is comprised in the received but not played media frames, inserting the blank frame to make the inserted blank frame adjacent to location of the at least one blank frame in the received but not played media frames.

3. The method according to claim 1, wherein the first threshold is not larger than the minimum information amount in the media frame which is able to be detected by a user.

4. The method according to claim 1, wherein the second threshold is not larger than the minimum difference between the information amount of a media frame and the information amount of a previous media frame which is able to be detected by a user.

5. The method according to claim 1, wherein the first threshold is not smaller than the second threshold.

6. The method according to claim 1, wherein inserting the blank frame comprises:

obtaining a second difference by subtracting the first threshold from the difference, and dividing the second difference by a playing duration of a single frame, to obtain a first number of blank frame needed to be inserted;

inserting the first number of blank frame in the received but not played media frames.

7. The method according to claim 1, wherein extracting the blank frame from the received but not played media frames comprises:

obtaining a third difference by subtracting the difference from the second threshold, dividing the third difference by the playing duration of a single frame, to obtain a second number of blank frame needed to be extracted; and extracting the second number of blank frame from the received but not played media frames.

8. The method according to claim 1, wherein at least one of the first threshold and the second threshold is an average value of at least one time-delay jitter prediction value among at least one time-delay jitter prediction value previously obtained.

9. The method according to claim 1, wherein determining whether at least one blank frame is comprised in the received but not played media frames comprises:

detecting whether a media frame is the blank frame when receiving the media frame;

if the media frame is the blank frame, setting an identifier for the blank frame; and if at least one media frame in the received but not played media frames possesses the identifier of the blank frame, determining the blank frame is comprised in the received but not played media frames.

10. The method according to claim 9, wherein the media frame is a voice frame, the blank frame is a silence frame, and detecting whether the media frame is the blank frame comprises:

calculating voice signal energy and background noise energy of the voice frame; and if ratio of the voice signal energy and the background noise energy is smaller than the first threshold, the voice frame being the silence frame.

11. The method according to claim 9, wherein the media frame is a video frame, the blank frame is a monochrome frame, and detecting whether the media frame is the blank frame comprises:

calculating an average value of Red Green Blue (RGB) value of each pixel in the media frame;

calculating a difference between the RGB value of each pixel and the average value; and if number of pixels, the difference between the RGB value of each of the pixels and the average value is larger than a preset third threshold, is smaller than the first threshold, determining the video frame to be the monochrome frame.

12. The method according to claim 9, wherein the media frame is a video frame, the blank frame is a successive and repeated frame, and detecting whether the media frame is the blank frame comprises:

determining whether RGB value of each pixel in the video frame is identical with the RGB value of corresponding pixel in a previous video frame; and if number of pixels with difference RGB values is smaller than the second threshold, the video frame being the successive and repeated frame.

13. A device for processing network time delay characteristics, comprising: a blank frame searching module, a time-delay determining module, a blank frame inserting module and a blank frame extracting module; wherein the blank frame searching module is configured to determine whether at least one blank frame is comprised in received but not played media frames in a real-time media, if at least one blank frame is comprised in the received but not played media frames, the blank frame searching module is further configured to provide a result indicating that the blank frame is comprised to the time-delay determining module, wherein the blank frame is a media frame, information amount of which is smaller than a preset first threshold, or a difference between the information amount of which and the information amount of a previous media frame is smaller than a preset second threshold;

the time-delay determining module is configured to determine whether network time delay changes, if the network time delay reduces and the result indicating that the blank frame is comprised has been received from the blank frame searching module, the time-delay determining module is further configured to trigger the blank frame extracting module; if the network time delay increases, the time-delay determining module is configured to trigger the blank frame inserting module;

the blank frame extracting module is configured to extract the blank frame from the received but not played media frames;

the blank frame inserting module is configured to insert the blank frame in the received but not played media frames;

wherein the time-delay determining module comprises a time-delay characteristics predicting unit, a first difference calculating unit and a determining unit;

the time-delay characteristics predicting unit is configured to obtain a time-delay litter prediction value, and a playing duration needed for playing the received but not played media frames;

the first difference calculating unit is configured to calculate a difference between the time-delay litter prediction value and the playing duration; and the determining unit is configured to compare the difference with the preset first threshold, determine the network time delay increases if the difference is larger than the first threshold, if the difference is not larger than the first threshold, the determining unit is configured to compare the difference with the preset second threshold, and determine the network time delay reduces if the difference is smaller than the second threshold.

14. The device according to claim 13, wherein the time-delay determining module is configured to trigger the blank frame inserting module when determining the network time delay increases and having received the result indicating that the blank frame is comprised from the blank frame searching module; and the blank frame inserting module is configured to insert the blank frame to make the inserted blank frame be adjacent to location of blank frame already existed in the received but not played media frames.

15. The device according to claim 13, wherein the time-delay characteristics predicting unit comprises: a first time obtaining sub-unit, a second time obtaining sub-unit and a second difference calculating sub-unit;

the first time obtaining sub-unit is configured to obtain a first time for extracting and playing a media frame last time;

the second time obtaining sub-unit is configured to obtain a second time for receiving a media frame last time; and the second difference calculating sub-unit is configured to subtract the second time obtained by the second time obtaining sub-unit from the first time obtained by the first time obtaining sub-unit, to obtain the time-delay jitter prediction value.

16. The device according to claim 13, wherein the blank frame inserting module comprises: a third difference calculating unit, an inserting-frame-number calculating unit and a frame inserting unit;

the third difference calculating unit is configured to subtract the first threshold from the difference obtained by the first difference calculating unit;

the inserting-frame-number calculating unit is configured to divide calculation result of the third difference calculating unit by a playing duration of a single frame, to obtain a first number of blank frame needed to be inserted; and the frame inserting unit is configured to insert the first number of blank frame in the received but not played media frames.

17. The device according to claim 13, wherein the blank frame extracting module comprises: a fourth difference calculating unit, an extracting-frame-number calculating unit and a frame extracting unit;

the fourth difference calculating unit is configured to subtract the difference obtained by the first difference calculating unit from the second threshold;

the extracting-frame-number calculating unit is configured to divide calculation result of the fourth difference calculating unit by a playing duration of a single frame, to obtain a second number of blank frame needed to be extracted; and the frame extracting unit is configured to extract the second number of blank frame from the received but not played media frames.

18. The device according to claim 13, wherein the device further comprises a silence frame detecting module;

the silence frame detecting module is configured to detect whether a voice frame is a silence frame when receiving the voice frame, and set an identifier for the silence frame if the received voice frame is the silence frame;

the blank frame searching module is configured to determine whether at least one voice frame in received but not played voice frames possesses the identifier of the silence frame, determine the silence frame is comprised in the received but not played voice frames if at least one voice frame in the received but not played voice frames possesses the identifier of the silence frame, and provide a result indicating that the silence frame is comprised to the time-delay determining module;

the time-delay determining module is configured to determine whether the network time delay changes, trigger the blank frame extracting module if determining the network time delay reduces and having received the result indicating that the silence frames is comprised from the blank frame searching module, and trigger the blank frame inserting module if determining the network time delay increases;

the blank frame extracting module is configured to extract the silence frame from the received but not played voice frames; and the blank frame inserting module is configured to insert the silence frame in the received but not played voice frames.

19. The device according to claim 18, wherein the silence frame detecting module comprises:

an energy calculating unit, configured to calculate voice signal energy and background noise energy of the voice frame; and a silence identifying unit, configured to calculate ratio of the voice signal energy and the background noise energy, and set the identifier for the silence frame if the ratio is smaller than a preset silence threshold.

* * * * *